US012698093B2

(12) United States Patent
Saint Requier et al.

(10) Patent No.: US 12,698,093 B2
(45) Date of Patent: Aug. 4, 2026

(54) VIRTUALIZED AIRCRAFT CONTROL ARCHITECTURE AND ASSOCIATED METHOD

(71) Applicant: DASSAULT AVIATION, Paris (FR)

(72) Inventors: Cyril Saint Requier, Saint-Cloud (FR); Samuel Grimon, Saint-Cloud (FR); Sébastien Camand, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 483 days.

(21) Appl. No.: 18/087,002

(22) Filed: Dec. 22, 2022

(65) Prior Publication Data

US 2023/0202671 A1      Jun. 29, 2023

(30) Foreign Application Priority Data

Dec. 24, 2021    (FR) ...................................... 2114489

(51) Int. Cl.
*B64D 43/00* (2006.01)
*B64D 45/00* (2006.01)

(52) U.S. Cl.
CPC ............. *B64D 43/00* (2013.01); *B64D 45/00* (2013.01); *B64D 2045/0085* (2013.01)

(58) Field of Classification Search
CPC ...................................................... B64D 43/00
See application file for complete search history.

(56) References Cited

U.S. PATENT DOCUMENTS 7,973,677 B2 *    7/2011  Jean ........................ H04L 67/12
                                                                370/310
8,538,602 B2 *    9/2013  Brot ..................... G05D 1/0077
                                                                244/221

(Continued)

FOREIGN PATENT DOCUMENTS

EP          3376375 A1      9/2018
FR          3087019 A1      4/2020
FR          3089375 A1      6/2020

OTHER PUBLICATIONS

A. Dietrich and F. Thomas. "Digital computer architecture as applied to an advanced flight control system," AIAA 1985-1949. 7th Computational Fluid Dynamics Conference. Jul. 1985. (Year: 1985).*

(Continued)

*Primary Examiner* — Michael A Berns
(74) *Attorney, Agent, or Firm* — Davidson Kappel LLC

(57)          ABSTRACT

A virtualized aircraft control architecture comprises a human-machine interface configured for generating a main command for arranging a functional element into a target configuration among a plurality of configurations; and a control module for controlling the functional element between its configurations. The architecture comprises a confirmation module of the main command configured for generating an associated safety command, an interface module configured for sending the main command and the safety command to the control module; the control module moving the functional element into the target configuration when the main command and the safety command, respectively, correspond to an expected main command and an expected safety command for arranging the at least one functional element in the target configuration.

20 Claims, 5 Drawing Sheets

(56) References Cited

U.S. PATENT DOCUMENTS

| | | | | |
|---|---|---|---|---|
| 8,600,583 | B2 * | 12/2013 | Fervel .................. | B64C 13/503 |
| | | | | 701/16 |
| 8,983,686 | B2 * | 3/2015 | Broquet .................. | G05B 9/03 |
| | | | | 340/963 |
| 9,483,949 | B2 * | 11/2016 | Ihns .................... | G06F 3/04892 |
| 10,338,560 | B2 * | 7/2019 | Liu ....................... | B64D 31/00 |
| 10,454,620 | B2 * | 10/2019 | Nammi ................. | H04L 1/1621 |
| 11,059,577 | B2 * | 7/2021 | Worsham, II .......... | B64D 45/00 |
| 11,237,720 | B2 * | 2/2022 | Urbanski ............ | G06F 3/04815 |
| 11,467,837 | B2 * | 10/2022 | Giuseppin ............. | B64D 45/00 |
| 2020/0110523 | A1 * | 4/2020 | Urbanski ............ | G06F 3/04815 |
| 2020/0183692 | A1 | 6/2020 | Giuseppin et al. | |
| 2020/0307780 | A1 * | 10/2020 | Worsham, II .......... | B64D 45/00 |
| 2023/0202671 | A1 * | 6/2023 | Saint Requier ........ | B64D 43/00 |
| | | | | 701/3 |
| 2023/0202672 | A1 * | 6/2023 | Saint Requier .... | G05B 19/0428 |
| | | | | 701/3 |

OTHER PUBLICATIONS

Ganote, 16-bit Versus 21-bit Considerations for Avionics Applications, Modern Technologies Corporation (Year: 1989).*
Search Report for priority application FR 2114489.

* cited by examiner

VIRTUALIZED AIRCRAFT CONTROL ARCHITECTURE AND ASSOCIATED METHOD

The present disclosure relates to a control architecture for controlling at least one functional element of an aircraft which can be arranged between a plurality of configurations, the architecture comprising:

at least one human-machine interface comprising a display and a display management unit for managing the display, the display management unit being configured for generating a main command based on an action of an operator aiming to arrange the at least one functional element in a target configuration;

at least one control module for controlling the at least one functional element able to arrange the at least one functional element in the configurations thereof;

at least one interface module configured for sending the main command to the at least one control module.

BACKGROUND

Such a virtualized control architecture allows a pilot, e.g. by means of a touch screen, to control a functional element of the aircraft.

There are a few virtualized architectures on current aircrafts. However, certain functions of certain functional elements are critical functions which, if not properly executed, can jeopardize the integrity of the aircraft or impair the safety of the passengers thereof.

Hence the main command sent to the functional element must indeed correspond to the function the operator wishes to perform.

However, in such a virtualized control architecture, there is a certain probability that the main command will be corrupted, so that the command does not really correspond to what the operator wants to do. Such corruption can occur during the generation of the main command, or during the sending thereof to the interface module and/or to the control module. The corruption of the command can then lead to the non-execution of the function desired by the operator or, worse still, to the execution of a function which is not desired by the operator. Such corruption of the command is thus a considerable risk for the aircraft. Hence, such an architecture is not suitable for controlling critical functions of the aircraft.

SUMMARY

A goal of the present disclosure is to overcome such drawback by improving the reliability of such a control architecture so that the control architecture can be used for guiding critical functions.

To this end, the subject matter of the present disclosure is a control architecture of the aforementioned type, further comprising, at least one main command confirmation module, configured for generating a safety command associated with the main command, the at least one interface module being configured for sending the safety command to the at least one control module, the at least one control module arranging the at least one functional element in the target configuration when the main command corresponds to an expected main command for arranging the at least one functional element into the target configuration and when the safety command corresponds to an expected safety command for arranging the at least one functional element in the target configuration.

The control architecture according to the present disclosure can further comprise one or a plurality of the features below, taken individually or according to all technically conceivable combinations:

the main command comprises a main byte, the expected main command comprises an expected main byte, the safety command comprises a safety byte and the expected safety command comprises an expected safety byte, the main byte and the expected main byte comprising N bits respectively, the safety byte and the expected safety byte comprising M bits respectively, N and M being integers greater than 8, N and M being e.g. equal to each other, in particular equal to 16, respectively;

the control architecture is such that:

at least K bits are distinct between the expected main byte and the expected safety byte;

at least K bits are distinct between the expected main byte corresponding to the arranging of the at least one functional element into the target configuration and any expected main byte corresponding to an alternative command differing from the arranging of the at least one functional element into the target configuration;

at least K bits are distinct between the expected safety byte corresponding to the arranging of the at least one functional element into the target configuration and any expected safety byte corresponding to an alternative command differing from the arranging of the at least one functional element into the target configuration;

K being an integer less than or equal to the minimum between N and M, K being in particular greater than or equal to 4;

the display management unit is configured for simultaneously sending the main command to the at least one interface module and to the at least one confirmation module, the at least one interface module being configured, upon receiving the main command, for sending the main command to the at least one control module, the at least one confirmation module generating the safety command after a delay starting when the at least one confirmation module receives the main command;

the at least one control module being configured for successively receiving a first command and a second command, the at least one control module comprising:

a main memory field configured for storing the first command;

a safety memory field configured for storing the second command;

a verification unit generating an authorization to arrange the at least one functional element into the target configuration when simultaneously the first command stored in the main memory field corresponds to the expected main command corresponding to the arranging of the at least one functional element into the target configuration and the second command stored in the safety memory field corresponds to the expected safety command corresponding to the arranging of the at least one functional element into the target configuration, the verification unit being configured for sending the authorization to arrange the at least one functional element into the target configuration to a control unit; and the control unit, arranging the at least one functional element into the target configuration when the control unit receives the authorization to arrange the at least one functional element into the target configuration;

the at least one confirmation module is configured, upon receipt of the main command, to generate a confirmation request for confirming the main command, the display management unit being able to display the confirmation request on the display to the operator;

the confirmation request comprises a character string associated with the main command;

the control architecture further comprising at least one confirmation device independent of the at least one human-machine interface and adapted to be actuated by the operator to confirm the main command when the confirmation request corresponds to a request for confirmation of arranging of the at least one functional element into the target configuration, the at least one confirmation module generating the safety command when the at least one confirmation device is actuated to confirm the main command;

the at least one confirmation device is configured to generate a confirmation when actuated to confirm the main command, the confirmation comprising for example a single confirmation bit, the control architecture further comprising at least one auxiliary interface module configured to transmit the confirmation to the confirmation module;

the at least one control module is configured for generating information representative of a current configuration of the at least one functional element, the display management unit being able to display said information intended for the operator, on the display.

The present disclosure further relates to a method for controlling at least one functional element of an aircraft, which can be arranged in a plurality of configurations using a control architecture as described above, the method comprising:

the generation of the main command according to an action of an operator aiming to arrange the at least one functional element in the target configuration;

the sending of the main command to the at least one control module and to the at least one confirmation module;

the generation by the at least one confirmation module of the safety command associated with the main command;

the sending of the safety command to the at least one control module;

the arranging of the at least one functional element into the target configuration when the main command corresponds to the expected main command for arranging the at least one functional element into the target configuration and when the safety command corresponds to the expected safety command for arranging of the at least one functional element into the target configuration;

The control method according to the present disclosure may comprise one or more of the following features, taken alone or in any technically feasible combination:

the display management unit simultaneously transmits the main command to the at least one interface module and to the at least one confirmation module, the at least one interface module transmitting the main command to the control module upon receipt of the main command, the at least one confirmation module generating the safety command after a delay starting when the at least one confirmation module receives the main command;

upon receipt of the main command, the at least one confirmation module generates a confirmation request for confirming the main command, the display management unit displaying the confirmation request on the display to the operator;

the operator actuates at least one confirmation device independent of the at least one human-machine interface to confirm the main command when the confirmation request corresponds to a request to confirm arranging the at least one functional element into the target configuration, the at least one confirmation module generating the safety command when the at least one confirmation device is actuated to confirm the main command.

BRIEF SUMMARY OF THE DRAWINGS

The present disclosure will be better understood upon reading the following description, given only as an example and making reference to the enclosed drawings, wherein.

DETAILED DESCRIPTION

Figure 1:
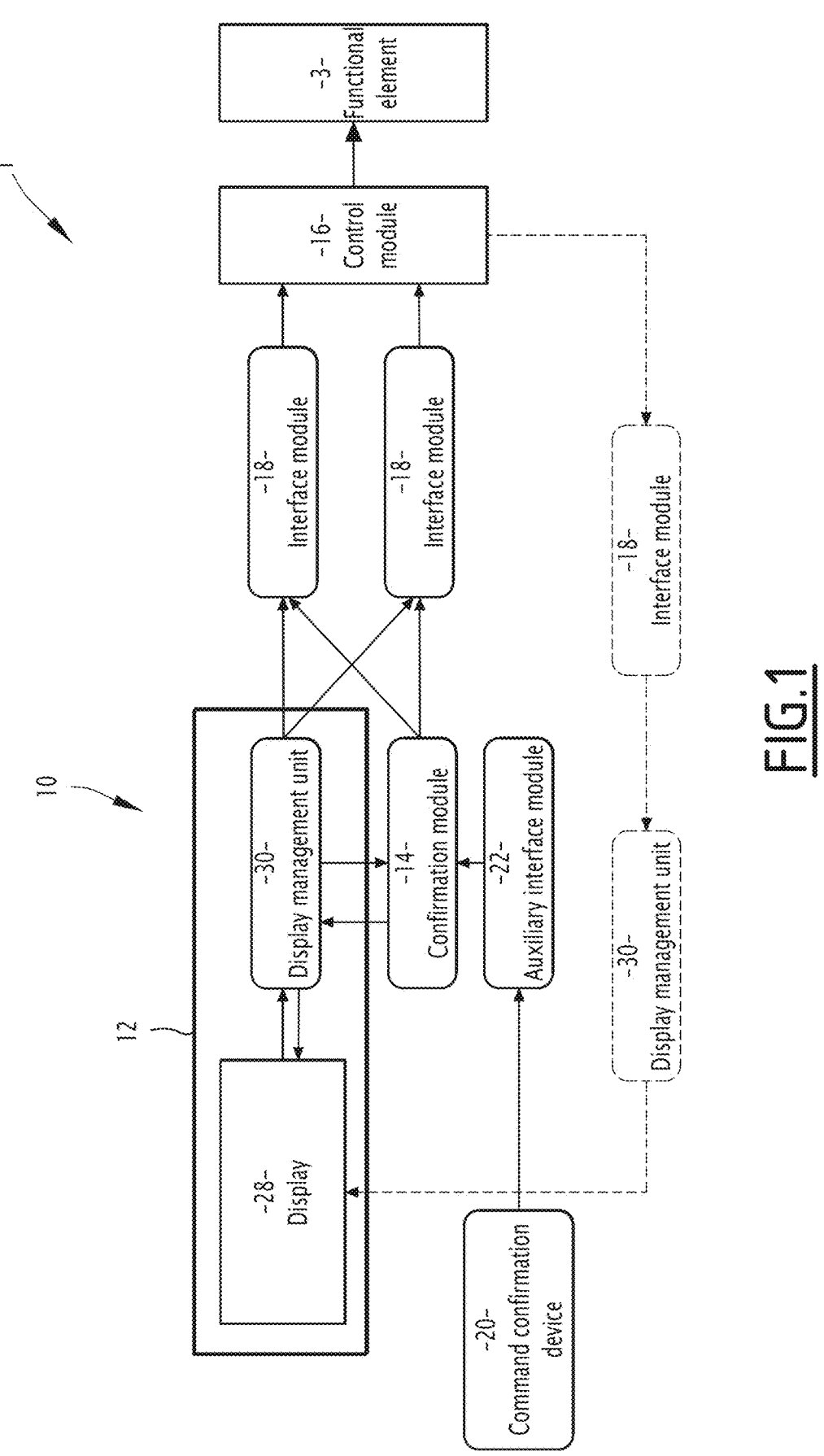
FIG. 1 is a simplified schematic representation of a portion of the control architecture according to a first embodiment of the present disclosure.

With reference to FIGS. 1 to 5, an aircraft 1 comprising at least one functional element 3 and a control architecture 10 for controlling the at least one functional element 3 is described.

In particular, the aircraft 1 comprises a plurality of functional elements 3 and the architecture 10 controls at least one of the functional elements 3. According to one example, the control architecture 10 controls a functional element 3. According to another example, the control architecture 10 controls a plurality of functional elements 3.

For reasons of conciseness, the following description describes the control by the architecture 10 of a given functional element 3 among other functional elements 3.

The functional element 3 is adapted to be arranged between a plurality of configurations. Among the plurality of configurations, the functional element 3 is adapted to be arranged from an initial configuration into a target configuration. The term "target configuration" refers to a configuration of the functional element 3, distinct from the initial configuration, which an operator of the aircraft 1 wishes to reach, e.g. a pilot of the aircraft 1, among all the possible configurations of the functional element 3.

As an example which will be repeated several times in the description so as to illustrate a concrete implementation of the present disclosure, the functional element 3 is a fuel transfer device for transferring fuel between a first fuel tank of the aircraft 1 and a second fuel tank of the aircraft 1.

Here, the fuel transfer device is adapted to be arranged in a configuration in which it prevents the transfer of fuel between the first tank and the second tank of the aircraft 1, a configuration in which it allows the transfer of fuel from the first tank to the second tank of the aircraft 1 and a configuration in which it allows the transfer of fuel from the second tank to the first tank of the aircraft 1.

The fuel transfer device comprises, for example, at least one mechanical or electromechanical hydraulic valve authorizing the transfer of fuel in one direction (first tank to second tank) or in the other direction (second tank to first tank), or preventing the transfer of fuel between the tanks.

As an example, in the following, the initial configuration corresponds to the configuration in which the transfer device authorizes the transfer of fuel from the second tank to the first tank of the aircraft 1 and the target configuration corresponds to the configuration in which the transfer device prevents the transfer of fuel between the first tank and the second tank of the aircraft 1. Thus, in an initial situation (illustrated in FIG. 2 as will be described below), fuel is transferred from the second tank to the first tank of the aircraft 1. Hereinafter in the description e.g., the operator wishes to be in a target situation in which no fuel is transferred between the tanks.

At least one control of the functional element 3 is e.g. critical for the aircraft 1. The term "critical" means that the function performed by the functional element 3 in response to certain command of the control architecture 10 is essential for maintaining the integrity of the aircraft 1 or the safety of passengers in the aircraft 1. In particular, the fuel transfer provided by the fuel transfer device is critical.

The control architecture 10 is configured for controlling the functional element 3 in the various configurations thereof, and in particular between the initial configuration and the target configuration. Only one command among the set of possible commands of the control architecture 10 corresponds to the arranging of the functional element 3 into the target configuration. Hereinafter, the possible commands which are different from the command for arranging the functional element 3 into the target configuration are called "alternative commands". The alternative commands correspond e.g. to a moving of the functional element 3 toward a configuration other than the target configuration or correspond to the control of other functional elements 3.

As illustrated in FIG. 1, the control architecture 10 comprises at least one human-machine interface 12 which can be actuated by the operator for generating a command, at least one confirmation module 14 for confirming the command, at least one control module 16 for controlling the functional element 3, at least one interface module 18 connecting the human-machine interface 12 and the at least one control module 16.

To keep the drawings clear, only one human-machine interface 12, one confirmation module 14, one control module 16 and two interface modules 18 are illustrated in FIG. 1. The interface module 18 illustrated in dotted lines is e.g. merged with one of the two interface modules 18 shown in solid lines.

Advantageously, the control architecture 10 comprises a plurality of human-machine interfaces 12, a plurality of confirmation modules 14, a plurality of control modules 16, one or a plurality of interface modules 18, in particular for providing a certain redundancy in order to overcome failure of one or a plurality of the human-machine interfaces 12, confirmation modules 14, control modules 16, and interface modules 18.

Figure 4:
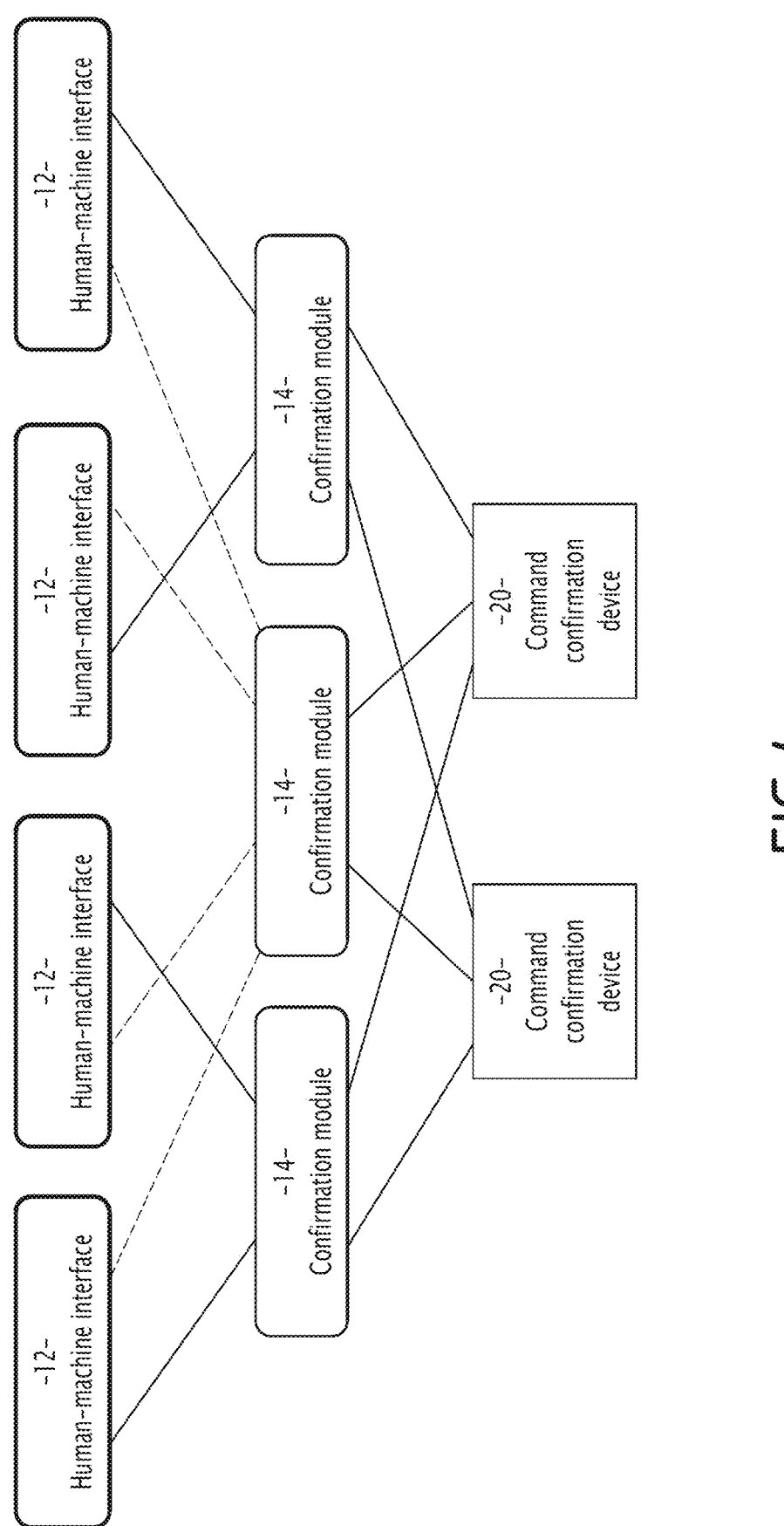
FIG. 4 is a simplified schematic representation of a portion of the control architecture of FIG. 1, different from that illustrated in FIG. 1.

According to the example illustrated in FIG. 4, the control architecture 10 comprises four human-machine interfaces 12 and three interconnected confirmation modules 14. As illustrated in FIG. 4, each human-machine interface 12 is connected to at least two confirmation modules 14. Thus, when a human-machine interface 12 is out of service, another human-machine interface 12 can be used as a replacement. When a confirmation module 14 is down, another confirmation module 14 can be used as a replacement.

Optionally, the control architecture 10 further comprises at least one command confirmation device 20 and at least one auxiliary interface module 22 connecting the confirmation device 20 and the confirmation module 14.

Advantageously, the control architecture 10 comprises several confirmation devices 20, in particular for providing redundancy in order to compensate for the failure of a confirmation device 20.

According to the illustrated example of FIG. 4, the control architecture 10 e.g. comprises two confirmation devices 20. As shown in FIG. 4, each confirmation module 14 is connected to at least two confirmation devices 20. When a confirmation device 20 is down, another confirmation device 20 can be used as a replacement.

The control architecture 10 comprises e.g. a plurality of interface modules 18, in particular for providing redundancy in order to compensate for failure of an interface module 18. Thus, a plurality of interface modules 18 connect the human-machine interface 12 and the control module 16 to one another, and the confirmation module 14 and the control module 16 to one another.

Hereinafter, for reasons of conciseness, only one human-machine interface 12, only one confirmation module 14, only one control module 16, only one interface module 18, only one confirmation device 20 and only one auxiliary interface module 22, are described. However, it is understood that for each of such elements of the architecture 10, the other elements with the same name are identical and perform the same or similar functions.

Thus, it is understood that in the example illustrated in FIG. 1, wherein the control architecture 10 comprises two interface modules 18, each of the two interface modules 18 acts in an identical or at least similar way within the control architecture 10.

With reference to FIG. 1, the human-machine interface 12 comprises a display 28 and a display management unit 30 for managing the display 28 (the display management unit 30 in dashed lines is merged with the display management unit 30 in solid lines).

The display 28 is advantageously a touch screen, with which the operator can interact directly by touch.

The display management unit 30 comprises e.g. at least one processor and at least one memory containing software modules suitable for being executed by the processor.

The display management unit 30 is advantageously able to display on the display 28, information intended for the operator and representative of the current configuration of the functional element 3. Such information tells the operator in which configuration the functional element 3 is in. The display of such information enables the operator to become aware of the current configuration of the functional element 3 and to make sure, after a control was initiated on the functional element 3, that the corresponding function has been performed by the functional element 3.

7

Figure 2:
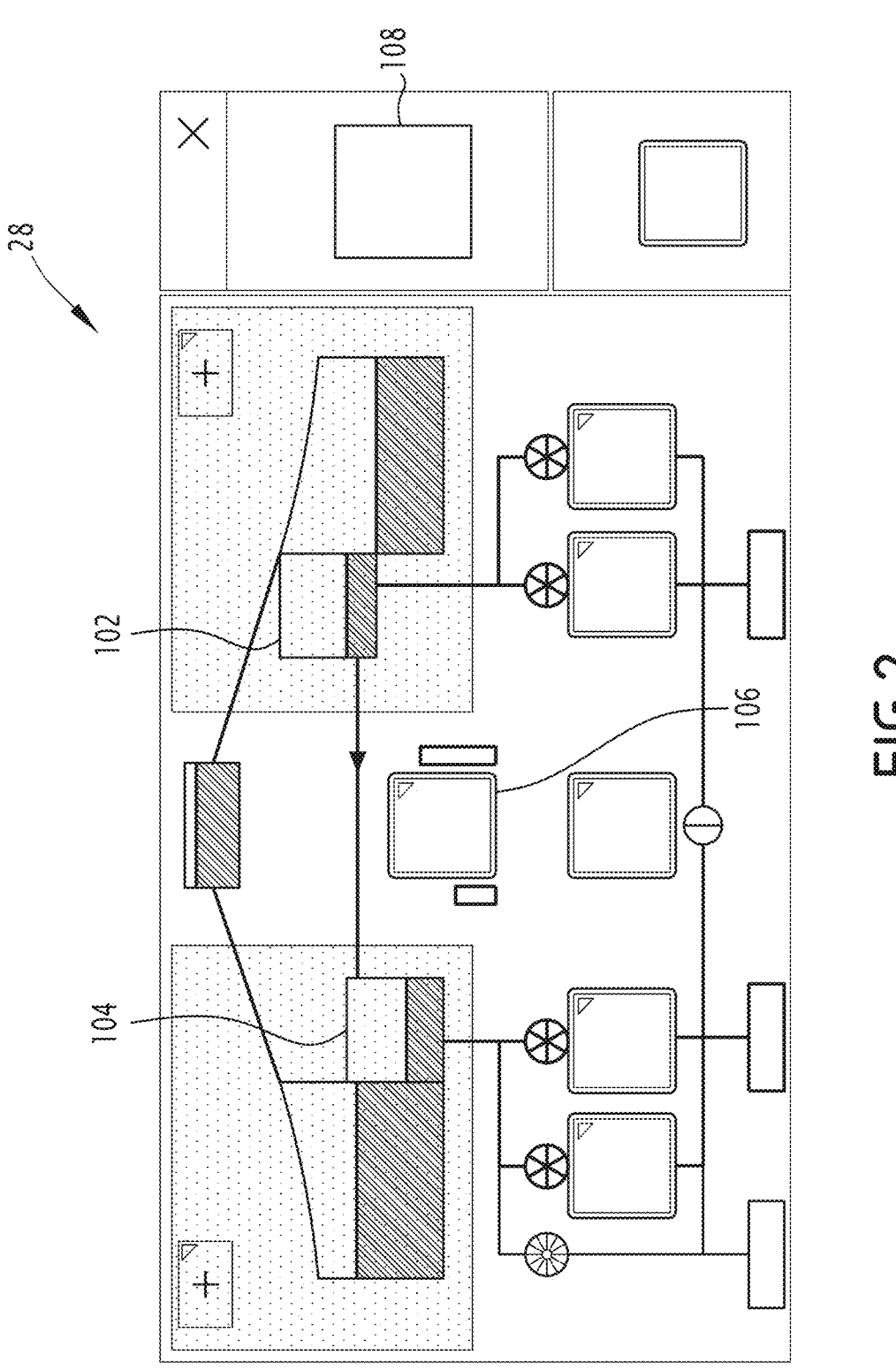
FIG. 2 is a schematic representation of a display of the control architecture shown in FIG. 1, the display displaying information representative of the current configuration of at least one functional element of the aircraft and a request for confirming a main command.
Figure 3:
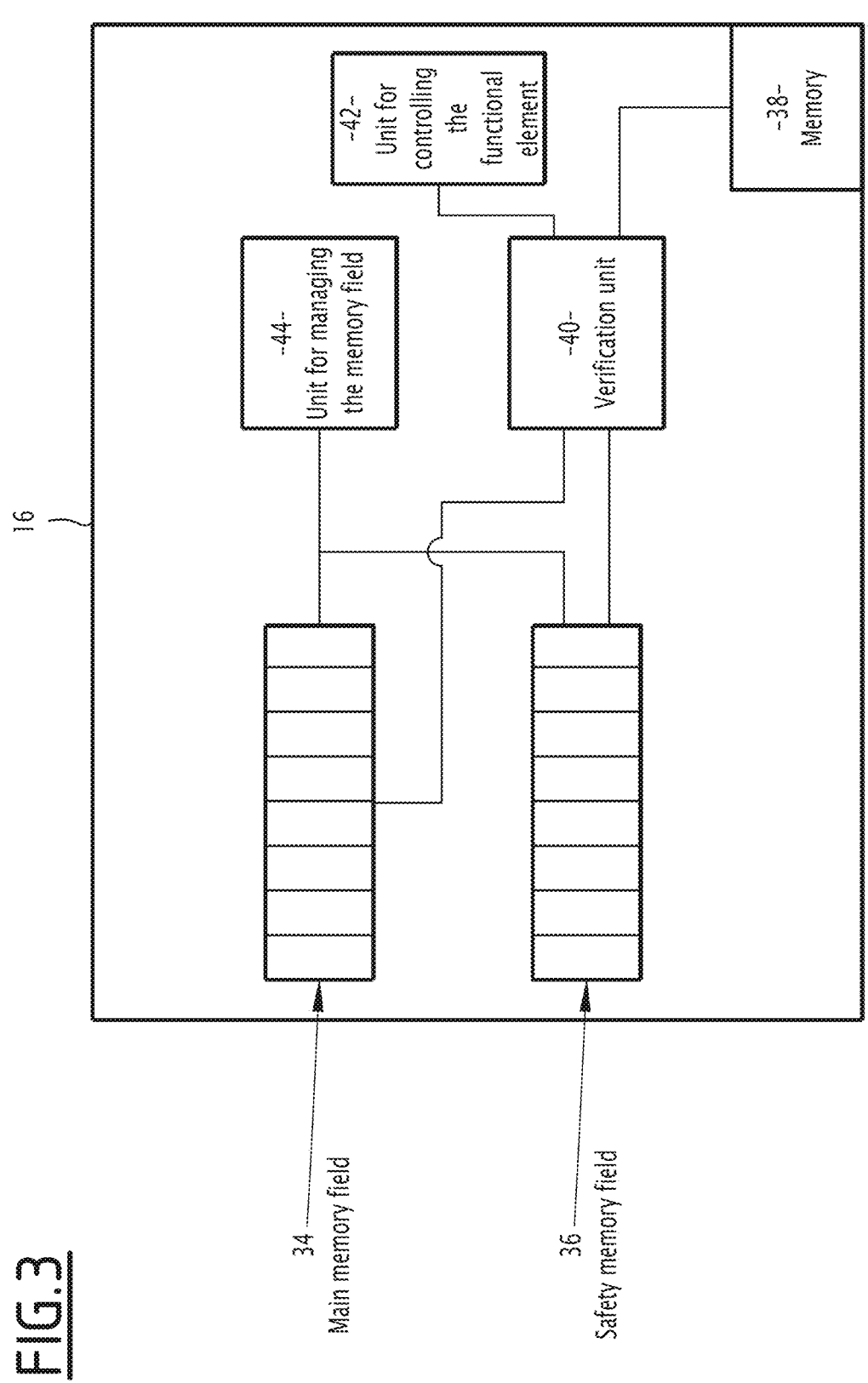
FIG. 3 is a simplified schematic representation of the control module of the portion of the control architecture shown in FIG. 1.

In FIG. 2, an example of an image displayed by the touch screen is shown. The image illustrates the example wherein the functional element 3 is the fuel transfer device. The display 28 displays information indicating that the current configuration of the functional element 3, i.e. the fuel transfer device, is the configuration wherein the transfer device allows the transfer of fuel from the second tank (represented by a graphic element 102) to the first tank (represented by a graphic element 104). Through this information, the operator is aware of the fuel transfer from the second tank to the first tank.

The display management unit 30 is configured for generating a main command based on an action of the operator aiming to arrange the functional element 3 into the target configuration. The action of the operator is e.g. pointing on a specific portion of the touch screen using one or more of his/her fingers or a dedicated pointing device.

The main command generated by the unit 30 depends on the action of the operator. More particularly, the main command depends on the location of the specific portion of the touch screen pointed at by the operator, on how long the pointing is maintained, on the direction of movement of the pointing when the operator moves the pointing over time and/or the number of pointings simultaneously performed by the operator.

In the example shown in FIG. 2, a portion 106 of the touch screen is intended to be pointed at by the operator when the operator wishes to move the functional element 3 toward the target configuration.

Under nominal operating conditions of the display management unit 30, the display management unit 30 is configured for generating a main command corresponding to the arranging of the functional element 3 into the target configuration when the portion 106 is pointed at.

The nominal operating conditions of the display management unit 30 are to be distinguished from the failure conditions of the display management unit 30 wherein the main command corresponding to the arranging of the functional element 3 into the target configuration would not be generated despite the operator pointing at the portion 106 or a main command different from the arranging of the functional element 3 into the target configuration would be generated despite the operator pointing the portion 106.

The main command comprises e.g. a main byte comprising N bits, N being an integer greater than 8, in particular equal to 16. In other words, the main byte is a byte of N bits, i.e. a byte with a length of N bits.

The display management unit 30 is advantageously configured for sending the main command to the control module 16 via the interface module 18 and for sending the main command to the confirmation module 14. In particular, the display management unit 30 is configured for sending the main command simultaneously to the interface module 18 and to the confirmation module 14.

Advantageously, as will be described below, the display management unit 30 is able to display a request for confirmation of the main command on the display 28 to the operator. The display of such confirmation request allows the operator to check that the main command actually corresponds to the execution of the function he wants, i.e. here the arranging of the functional element 3 in the target configuration.

On the example of FIG. 2, a dedicated graphic element 108 is intended for being displayed on the display 28 so as to communicate the confirmation request to the operator.

The confirmation module 14 is configured for generating a safety command associated with the main command generated by the display management unit 30.

The confirmation module 14 is independent of the human-machine interface 12. The expression "independent" means that the confirmation module 14 has electronic or mechanical systems distinct from same of the human-machine interface 12, so that any failure of the human-machine interface 12 does not affect the confirmation module 14 and vice versa.

In particular, the safety command comprises a safety byte including M bits, M being e.g. an integer greater than 8, e.g. equal to N, in particular equal to 16. In other terms, the safety byte is a byte of M bits, i.e. a byte with a length of M bits.

It should be noted that the values of N and M can be adapted according to needs depending upon e.g. the electronic architecture of the modules 14, 16, 18, of the desired degree of safety, of the desired degree of complexity of the control architecture 10.

Advantageously, the safety command is different from the main command. In particular, the safety byte is different from the main byte. In other words, the safety byte and the main byte correspond to different combinations of bits.

The confirmation module 14 e.g. generates the safety command after a delay starting when the confirmation module 14 receives the main command. The delay is comprised e.g. between 500 ms and 15 s. For example, the delay is greater than or equal to a minimum time, which provides a certain time lag for a sending to the control module 16 of the safety command, chronologically with respect to the sending of the main command to the control module 16.

In particular, as will be described hereinbelow, the confirmation module 14 generates the safety command when the confirmation device 20 is actuated for confirming the main command. The delay is then greater than or equal to a time the pilot needs for actuating, where appropriate, the confirmation device 20.

Advantageously, the confirmation module 14 is configured, after receiving the main command, for generating the request for confirming the main control. In particular, the confirmation request comprises a character string associated with the main command. The confirmation module 14 is further configured e.g. for sending the confirmation request to the display management unit 30 so that same displays the request on the display 28.

With reference of FIG. 2, the graphic element 108 corresponding to the confirmation request e.g. comprises a character string. In the example shown in FIG. 2, when the main command corresponds to the arranging of the functional element 3 into the target configuration, the character string corresponds to a message such as e.g. «X-TK2-1 OFF Confirm?» which transcribes a request to confirm the arranging of the functional element 3 into the target configuration. When the main command differs from the command corresponding to the arranging of the functional element 3 into the target configuration, a character string corresponding to another message is displayed. Such character string then corresponds e.g. to the arranging of the functional element 3 into a configuration different from the target configuration, to the control of a distinct functional element 3, or to no tangible control of any functional element 3 of the aircraft 1. The operator then becomes aware that the main command does not correspond to the arranging of the functional element 3 into the target configuration. The above situation can result either from incorrect action by the operator, e.g. incorrect pointing on the touch screen corresponding to an alternative command, or from failure of the display management unit 30 which has not generated the appropriate main command despite a correct action from the operator.

The control module 16 is able to switch the functional element 3 between the configurations thereof. To this end, the control module 16 comprises any electronic, mechanical or electromechanical element necessary for controlling the functional element 3.

If e.g. the functional element 3 is a fuel transfer device, the control module 16 comprises a mechanical or electromechanical component able to open or close the at least one valve of the fuel transfer device.

In particular, the control module 16 arranges the functional element 3 into the target configuration when the main command corresponds to an expected main command for moving the functional element 3 into the target configuration and when the safety command corresponds to an expected safety command for moving the functional element 3 into the target configuration.

Advantageously, the expected main command for the arranging of the functional element 3 into the target configuration comprises an expected main byte for the arranging of the functional element 3 into the target configuration including N bits. In other terms, the expected main byte for arranging the functional element 3 into the target configuration is a byte of N bits, i.e. a byte having a length of N bits.

Also advantageously, the expected safety command for the arranging of the functional element 3 into the target configuration comprises an expected safety byte for the arranging of the functional element 3 into the target configuration including M bits. In other words, the expected safety byte for arranging the functional element 3 into the target configuration is a byte of M bits, i.e. a byte with a length of M bits.

According to one example, the expected safety command for arranging the functional element 3 into the target configuration is different from the expected main command for arranging functional element 3 into the target configuration. In particular, the expected safety byte for arranging the functional element 3 into the target configuration is different from the expected main byte for arranging the functional element 3 into the target configuration. In other words, the expected safety byte and the expected main byte for the arranging of the functional element 3 into the target configuration correspond to different combinations of bits.

At least K bits e.g. are distinct between the expected main byte for arranging the functional element 3 into the target configuration and the expected safety byte for arranging the functional element 3 into the target configuration, K being an integer less than or equal to the minimum between N and M, K being in particular greater than or equal to 4. In particular, if N is equal to M, for each of the K bits of the expected main byte for moving the functional element 3 into the target configuration, located at a position p of said expected main byte, p having the value of an integer between 1 and N, the bit at position p of the expected safety byte for arranging the functional element 3 into the target configuration is distinct from said bit of said expected main byte.

The control module 16 is configured for successively receiving a first command and a second command from the interface module 18. As will be described in more detail hereinafter, the first command corresponds to the main command.

During a nominal operation of the interface module 18, the second command corresponds to the safety command. Indeed, the control module 16 is intended for receiving the safety command after a time at least equal to the delay. This is due in particular to the fact that the safety command is generated after the delay. During a failure of the interface module 18, it is possible that the second command corresponds, like the first command, to the main command.

The control module 16 comprises e.g. a main memory field 34 configured for storing the first command, a safety memory field 36 configured for storing the second command, a memory 38, a verification unit 40 and a unit 42 for controlling the functional element 3.

Optionally, the control module 16 further comprises a unit 44 for managing the memory fields 34, 36.

Advantageously, the control module 16 comprises a single main memory field 34 and a single safety memory field 36.

Herein, the main memory field 34 can store only a single main command at a given instant, e.g. a single and only one main byte. In other terms, at a given instant, the main memory field 34 is configured for storing N bits.

Therein again, the safety memory field 36 can store only a single safety command at a given instant, e.g. a single safety byte. In other words, at a given instant, the safety memory field 36 is configured for storing M bits.

Thus, at a given instant, the control module 16 can process only a single, unique command.

The memory 38 of the control module 16 stores the expected main command and the expected safety command corresponding to the arranging of the functional element 3 into the target configuration and correspondingly associates same with the arranging of the functional element 3 into the target configuration. The memory 38 e.g. correspondingly associates the expected main byte and the expected safety byte corresponding to the arranging of the functional element 3 into the target configuration with the arranging of the functional element 3 into the target configuration.

Advantageously, the memory 38 also stores the expected main commands and the expected safety commands corresponding to arranging of the functional element 3 into configurations different from the target configuration and correspondingly associates same with the arranging of the functional element 3 into said corresponding different configurations. The memory 38 e.g. correspondingly associates expected main bytes and expected safety bytes corresponding to arranging of the functional element 3 into different configurations of the target configuration and correspondingly associates same with the arranging of the functional element 3 into said different corresponding configurations.

Advantageously, at least K bits are distinct between the expected main byte corresponding to the arranging of the functional element 3 into the target configuration and any expected main byte corresponding to an alternative command differing from the arranging of the functional element 3 into the target configuration.

In the case where N is equal to M e.g. for any expected main byte corresponding to an alternative command, for each K bits of the expected main byte corresponding to the arranging of the functional element 3 into the target configuration located at a position p of said expected main byte corresponding to the arranging of the functional element 3 into the target configuration, the bit at position p of said expected main byte corresponding to said alternative command is distinct from said bit of the expected main byte corresponding to the arranging of the functional element 3 into the target configuration.

Advantageously, at least K bits are distinct between the expected safety byte corresponding to the arranging of the functional element 3 into the target configuration and any expected safety byte corresponding to an alternative command differing from the arranging of the functional element 3 into the target configuration.

In the case where N is equal to M e.g., for any expected safety byte corresponding to an alternative command, for each K bits of the expected safety byte corresponding to the arranging of the functional element 3 into the target configuration located at a position p of said expected safety byte, corresponding to the arranging of the functional element 3 into the target configuration, the bit at position p of said expected safety byte corresponding to said alternative command is distinct from said bit of the expected safety byte corresponding to the arranging of the functional element 3 into the target configuration.

Thus, the bytes corresponding to the arranging of the functional element 3 into the target configuration and the bytes corresponding to alternative commands are sufficiently different, so as to minimize the risk that, by an error in the coding of a few bits, a byte corresponding to an alternative command is confused with a byte corresponding to the arranging of the functional element 3 into the target configuration.

When simultaneously the first command stored in the main memory field 34 corresponds to the expected main command corresponding to the arranging of the functional element 3 into the target configuration and the second command stored in the safety memory field 36 corresponds to the expected safety command corresponding to the arranging of the functional element 3 into the target configuration, the verification unit 40 generates an authorization to arrange the functional element 3 to the target configuration.

To this end, the verification unit 40 is connected to the memory 38 and is initially configured for identifying whether the first command stored in the main memory field 34 corresponds to an arranging of the functional element 3 into one of the possible configurations of the functional element 3.

If the first command stored in the main memory field 34 does not correspond to any arranging of the functional element 3 into one of the possible configurations of the functional element 3, no authorization to arrange the functional element 3 into any one of the possible configurations is generated.

If the first command stored in the main memory field 34 corresponds to the arranging of the functional element 3 into one of the possible configurations of the functional element 3, in a second step, the verification unit 40 identifies whether the second command stored in the safety memory field 36 also corresponds to the arranging of the functional element 3 into said possible configuration of the functional element 3.

When the first command stored in the main memory field 34 does not correspond to the expected main command corresponding to the arranging of the functional element 3 into the target configuration or when the second command stored in the safety memory field 36 does not correspond to the expected safety command corresponding to the arranging of functional element 3 into the target configuration, no authorization to move the functional element 3 into the target configuration is generated.

During a failure of the display management unit 30 or of the interface module 18, it is possible that the main command is sent twice, successively, to the control module 16, within a time interval less than the delay. The main memory field 34 and the safety memory field 36 then both store the main command. Since at least K bits are distinct between the expected main byte corresponding to the arranging of the functional element 3 into the target configuration and the expected safety byte corresponding to the arranging of the functional element 3 into the target configuration, the risk that an authorization to arrange the functional element 3 into the target configuration is generated as a result of such a failure is considerably reduced.

The verification unit 40 is further configured for sending the authorization to arrange the functional element 3 into the target configuration to the control unit 42.

The control unit 42 is configured for arranging the functional element 3 in the different configurations thereof.

The control unit 42 advantageously comprises a memory zone (not shown) suitable for storing the information representative of the current configuration of the functional element 3.

When the control unit 42 receives the authorization to arrange the functional element 3 into the target configuration, the control unit 42 moves the functional element 3 into the target configuration.

The control unit 42 then generates updated information representative of the current configuration of the functional element 3 and stores same in the memory zone thereof by overwriting the information present therein.

The memory field management unit 44 is advantageously able to delete the commands stored in the memory fields. More particularly, when at the end of a predefined time beginning when the main memory field 34 stores the first command, no second command is received by the control module 16, the unit 44 deletes the main command stored in the main memory field 34. The main command generated following the action of the operator on the human-machine interface 12 is then not taken into account by the control architecture 10. The preset time is comprised e.g. between 1 s and 15 s.

Advantageously, when after a time starting at the moment when the main memory field 34 receives the first command, is greater than the predefined time, and when the control module 16 receives a subsequent command, the main memory field 34 stores said subsequent command in replacement of said first command.

Thus, as explained hereinabove, the control module 16 is configured for generating information representative of the current configuration of the functional element 3. E.g. after moving the functional element 3 into the target configuration, the control unit 42 generates information indicating that the current configuration of the functional element 3 is now the target configuration. As a variant or potentially in addition, the control module 16 comprises e.g. a sensor (not shown) connected to the control unit 42, configured for determining the current configuration of the functional element 3. In the case where the functional element 3 is the fuel transfer device, the sensor determines e.g. whether the or each valve of the fuel transfer device is open or closed.

The interface module 18 is interposed between the human-machine interface 12 and the control module 16 and also between the confirmation module 14 and the control module 16.

The interface module 18 is configured for sending the main command, generated by the display management unit 30, and the safety command, generated by the confirmation module 14, to the control module 16. In particular, the interface module 18 is configured, upon receiving the main command, for sending the main command to the control module 16. In other terms, during nominal operation, the reception of the main command by the control module 16 is carried out earlier in time than the reception of the safety command by the control module 16.

The interface module 18 is further configured for sending the information generated by the control module 16 to the display management unit 30.

The confirmation device 20 is independent of the human-machine interface 12. "Independent" means that the confirmation device 20 has electronic or mechanical systems distinct from same of the human-machine interface 12, so that any failure of the human-machine interface 12 does not affect the confirmation device 20 and vice versa.

The confirmation device 20 is suitable for being operated by the operator for confirming the main command when the request for confirmation, shown on display 28, corresponds to a request for confirmation of arranging the operating element 3 to the target configuration.

The confirmation device 20 comprises e.g. a button arranged in a cockpit of the aircraft 1.

The delay after which the confirmation module 14 generates the safety command corresponds at least to the time the operator needs to become aware of the confirmation request and to actuate the confirmation device 20.

Advantageously, the confirmation device 20 is configured for generating a confirmation when same is actuated for confirming the main command. The confirmation comprises e.g. a single confirmation bit. Advantageously, when, at the end of the predefined time, the confirmation device 20 has not been actuated, the main command is invalidated, i.e. the main command generated following the action of the operator on the human-machine interface 12 is then not taken into account by the control architecture 10.

The auxiliary interface module 22 is configured for sending the confirmation to the confirmation module 14. According to one example, the auxiliary interface module 22 is merged with the interface module 18.

Hereinafter, a method for controlling the functional element 3 between a plurality of configurations using the control architecture 10 is described. Herein, the operator wants to arrange the functional element 3 into a target configuration.

E.g., initially, the display management unit 30 displays to the operator, the information representative of the current configuration of the functional element 3. The operator takes the information from the display 28. The information indicates that the functional element 3 is in a current configuration different from the target configuration.

First, a main command is generated based on an action of the operator aiming to arrange the functional element 3 into the target configuration. To this end, in the example shown in FIG. 2 where the display 28 is a touch screen, the operator points to the portion 106 of the touch screen.

In particular, the display management unit 30 generates the main command.

The main command is then sent to the control module 16, in particular via the interface module 18, and to the confirmation module 14. In particular, the display management unit 30 sends the main command simultaneously to the interface module 18 and to the confirmation module 14. In particular, upon receiving the main command, the interface module 18 sends the main command to the control module 16.

Upon receipt of the main command, the confirmation module 14 generates a request for confirming the main command. The confirmation module 14 then sends the confirmation request to the display management unit 30 which, in particular, displays same to the operator on the display 28.

In particular, the character string of the confirmation request is displayed on the display 28. By reading the character string of the confirmation request, the operator recognizes whether the confirmation request corresponds to a confirmation request for arranging the functional element 3 into the target configuration or not.

When the confirmation request does not correspond to a request for confirmation of arranging the functional element 3 into the target configuration, the operator becomes aware that the generated main command does not correspond to arranging the functional element 3 into the target configuration.

On the other hand, when the confirmation request corresponds to a request for confirmation of arranging the functional element 3 into the target configuration, the operator operates the confirmation device 20 to confirm the main command.

After sending the main command to the confirmation module 14, in particular when the confirmation device 20 is operated to confirm the main command, the confirmation module 14 generates the safety command associated with the main command.

In particular, the confirmation module 14 generates the safety command after a delay starting when it receives the main command.

The safety command is then sent to the control module 16.

When the main command corresponds to the expected main command for arranging the functional element 3 into the target configuration and when the safety command corresponds to the expected safety command for arranging the functional element 3 into the target configuration, the functional element 3 is arranged into the target configuration.

In particular, the control module 16 successively receives a first command and a second command. The main memory field 34 of the control module 16 stores the first command. The safety memory field 36 of the control module 16 stores the second command.

The verification unit 40 generates the authorization to arrange the functional element 3 into the target configuration when, simultaneously, the first command stored in the main memory field 34 corresponds to the expected main command corresponding to the arranging of the functional element 3 into the target configuration, and the second command stored in the safety memory field 36 corresponds to the expected safety command corresponding to the arranging of the functional element 3 into the target configuration.

After having generated the authorization to arrange the functional element 3 into the target configuration, the verification unit 40 sends said authorization to the control unit 42.

The control unit 42 then arranges the functional element 3 into the target configuration. The control unit 42 then generates the updated information representative of the current configuration of the functional element 3 and stores same in the memory zone thereof by overwriting the information present therein.

Advantageously, if at the end of a predefined time, starting when the first command is stored in the main memory field 34, no second command is received by the control module 16, the memory field management unit 44 empties the main memory field 34.

Advantageously, the control module 16 generates the information representative of the current configuration of the functional element 3. In particular, as explained above, the control unit 42 generates the information.

Such updated information data are then sent to the display management unit 30.

The operator can then consult the display 28 for evaluating whether the action he/she performed on the human-machine interface 12 resulted in an arranging of the functional element 3 in the target configuration thereof. Alternatively or in addition, the operator can consult an instrument within the cockpit indicating the configuration of the functional element 3.

Figure 5:
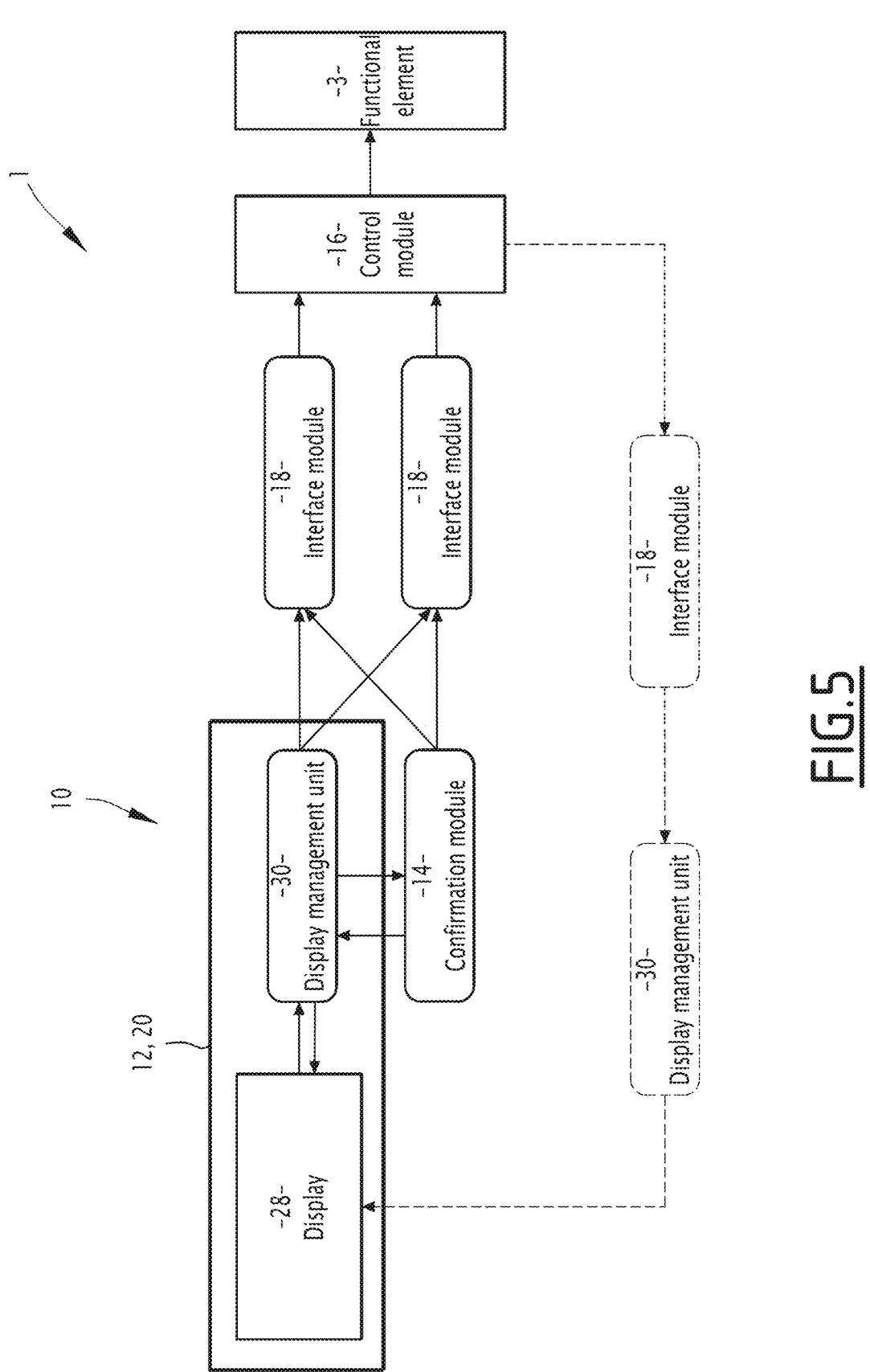
FIG. 5 is a simplified schematic representation of a portion of the control architecture according to a second embodiment of the present disclosure.

According to a second embodiment of the present disclosure illustrated in FIG. 5, the confirmation device 20 is merged with the human-machine interface 12 and the architecture 10 is devoid of an auxiliary interface module 22.

Thus, when the confirmation request corresponds to a request to confirm the arranging of the functional element 3 into the target configuration, to confirm the main command, the operator operates the human-machine interface 12.

For example, in the case where the display 28 is a touch screen, a portion of the touch screen is intended to be pointed at by the operator when the operator wishes to confirm the main command.

According to a non-illustrated embodiment, the control architecture 10 is devoid of a confirmation device 20 and an auxiliary interface module 22.

No confirmation request is then generated by the confirmation module 14.

The delay after which the confirmation module generates the safety control is then predefined.

According to one variant, the display 28 is a non-touch screen. The operator then acts on the display 28 by means e.g. of a mouse.

According to another variant, the human-machine interface 12 includes an audio input peripheral, such as a microphone. The action of the operator aiming to arrange the functional element 3 into the target configuration is then a voice control.

According to yet another variant, the confirmation device 20 can be actuated between a plurality of configurations of which one corresponds to the confirmation of the main command and another corresponds to the invalidation of the main command.

According to yet another variant, the interface module 18 shown with a dotted line in FIG. 1 is an additional module to the two interface modules 18 shown with a solid line.

In all of the above, the control architecture 10 comprises at least one computer comprising a processor and at least one memory containing software modules capable of being executed by the processor. Within such framework, the confirmation module 14, the control module 16, the interface module 18 and the auxiliary interface module 22 are software modules stored in the memory. As a variant, at least some of the modules are produced in the form of dedicated electronic circuits.

By using the present disclosure, the risks for the control architecture 10 of performing an unwanted function, i.e. the control module 16 taking into account a command which does not correspond to a command desired by the operator, are considerably reduced. By using the present disclosure, such a risk is advantageously less than $10^{-7}$. Such low probability of error is achieved in particular by means of the simultaneous check of correspondence between the main command, generated as a function of an action of the operator, and the expected main command for the arranging of the functional element 3 into the target configuration and between the safety command, generated according to the main command, and the expected safety command for arranging the functional element 3 into the target configuration.

Such risk is further reduced by the following features:

a confirmation request in the form of a text field is sent to the operator. This allows the operator to check if the main command corresponds to the command he wants to perform. When the operator realizes, by reading the text field, that the main command does not correspond to the command he wants to perform, he can then assume that his/her action with regard to the human-machine interface was wrong or that the display management unit has failed;

the main command is confirmed via the confirmation device which is independent of the human-machine interface and is simple (the confirmation comprises a single confirmation bit). The confirmation is thus realized in a secure way, without being impacted by a possible failure of the human-machine interface;

the main command and the safety command are different, more particularly the main byte and the safety byte are different. In this way it is possible to reduce the risk for the control module to mix up same;

the expected main command, or the expected safety command, respectively, corresponding to the arranging of the functional element into the target configuration, is different from any expected main command, or from any expected safety control, respectively, corresponding to an alternative command different from the arranging of the functional element into the target configuration. In this way, it is possible to reduce the risk for the control module to erroneously authorize the functional element to be arranged into a configuration other than the target configuration; and information representative of the current configuration of the functional element is displayed to the operator. The operator can follow the evolution of the current configuration of the functional element following his/her action on the human-machine interface for checking the arranging of the functional element toward the target configuration.

What is claimed is:

1. A control architecture for controlling at least one functional element of an aircraft, the at least one functional element being arrangeable in a plurality of configurations, the at least one functional element being controllable by an operator for maintaining integrity of the aircraft or safety of passengers in the aircraft during flight, the control architecture comprising:

at least one human-machine interface comprising a display and a display management unit for managing the display, the display management unit being configured for generating a main command in response to an action of the operator on a screen of the display or an audio input peripheral aiming to arrange the at least one functional element in a target configuration;

at least one control module for controlling the at least one functional element to arrange the at least one functional element in the plurality of configurations thereof;

at least one interface module configured for sending the main command to the at least one control module; and at least one main command confirmation module configured for generating a safety command associated with the main command, the at least one interface module being configured for sending the safety command to the at least one control module, the at least one control module determining that the main command generated in response to the action of the operator is not corrupt and arranging the at least one functional element in the target configuration specified by the main command when the main command corresponds to an expected main command for arranging the at least one functional element into the target configuration and when the safety command corresponds to an expected safety command for arranging the at least one functional element in the target configuration.

2. The control architecture according to claim 1, wherein the main command comprises a main byte, the expected main command comprises an expected main byte, the safety command comprises a safety byte, and the expected safety command comprises an expected safety byte, the main byte and the expected main byte comprising N bits respectively, the safety byte and the expected safety byte comprising M bits respectively, N and M being integers greater than 8.

3. The control architecture according to claim 2, wherein N and M are equal to each other.

4. The control architecture according to claim 2, wherein N and M are equal to 16 respectively.

5. The control architecture according to claim 2, wherein:

at least K bits are distinct between the expected main byte and the expected safety byte;

at least K bits are distinct between the expected main byte corresponding to the arranging of the at least one functional element into the target configuration and any expected main byte corresponding to an alternative command differing from the arranging of the at least one functional element into the target configuration;

at least K bits are distinct between the expected safety byte corresponding to the arranging of the at least one functional element into the target configuration and any expected safety byte corresponding to an alternative command differing from the arranging of the at least one functional element into the target configuration, K being an integer less than or equal to a minimum between N and M.

6. The control architecture according to claim 5, wherein K is greater than or equal to 4.

7. The control architecture of according to claim 1, wherein the display management unit is configured for simultaneously sending the main command to the at least one interface module and to the at least one command confirmation module, the at least one interface module being configured, upon receiving the main command, for sending the main command to the at least one control module, the at least one command confirmation module generating the safety command after a delay starting when the at least one command confirmation module receives the main command.

8. The control architecture according to claim 7, wherein the at least one control module is configured for successively receiving a first command and a second command, the at least one control module comprising:

a main memory field configured for storing the first command;

a safety memory field configured for storing the second command;

a verification unit generating an authorization to arrange the at least one functional element into the target configuration when simultaneously the first command stored in the main memory field corresponds to the expected main command corresponding to the arranging of the at least one functional element into the target configuration and the second command stored in the safety memory field corresponds to the expected safety command corresponding to the arranging of the at least one functional element into the target configuration, the verification unit being configured for sending the authorization to arrange the at least one functional element into the target configuration to a control unit; and the control unit, arranging the at least one functional element into the target configuration when the control unit receives the authorization to arrange the at least one functional element into the target configuration.

9. The control architecture according to claim 1, wherein the at least one command confirmation module is configured, upon receipt of the main command, to generate a confirmation request for confirming the main command, the display management unit being configured to display the confirmation request on the display to the operator.

10. The control architecture according to claim 9, wherein the confirmation request comprises a character string associated with the main command.

11. The control architecture according to claim 9, further comprising at least one confirmation device independent of the at least one human-machine interface and adapted to be actuated by the operator to confirm the main command when the confirmation request corresponds to a request for confirmation of arranging of the at least one functional element into the target configuration, the at least one command confirmation module generating the safety command when the at least one confirmation device is actuated to confirm the main command.

12. The control architecture according to claim 11, wherein the at least one confirmation device is configured to generate a confirmation when actuated to confirm the main command, the control architecture further comprising at least one auxiliary interface module configured to transmit the confirmation to the at least one command confirmation module.

13. The control architecture according to claim 12, wherein the confirmation comprises a single confirmation bit.

14. The control architecture according to claim 1, wherein the at least one control module is configured for generating information representative of a current configuration of the at least one functional element, the display management unit being configured to display said information intended for the operator, on the display.

15. The control architecture according to claim 1, wherein the at least one functional element is a fuel transfer device for transferring fuel between a first fuel tank of the aircraft and a second fuel tank of the aircraft, the fuel transfer device being adapted to be arranged in a configuration in which it prevents the transfer of fuel between the first tank and the second tank of the aircraft, a configuration in which it allows the transfer of fuel from the first tank to the second tank of the aircraft and a configuration in which it allows the transfer of fuel from the second tank to the first tank of the aircraft.

16. The control architecture according to claim 15, wherein the control module comprises a mechanical or electromechanical component able to open or close at least one valve of the fuel transfer device authorizing the transfer of fuel from the first fuel tank to the second fuel tank, from the second fuel tank to the first fuel tank, or preventing the transfer of fuel between the first and second fuel tanks.

17. A control method for controlling at least one functional element of an aircraft, which can be arranged in a plurality of configurations using the control architecture according to claim 1, the method comprising:

generating the main command according to an action of an operator aiming to arrange the at least one functional element in the target configuration;

sending the main command to the at least one control module and to the at least one command confirmation module;

generating by the at least one command confirmation module of the safety command associated with the main command;

sending the safety command to the at least one control module;

arranging the at least one functional element into the target configuration when the main command corresponds to the expected main command for arranging the at least one functional element into the target configuration and when the safety command corresponds to the expected safety command for arranging of the at least one functional element into the target configuration.

18. The control method according to claim 17, wherein the display management unit simultaneously transmits the main command to the at least one interface module and to the at least one command confirmation module, the at least one interface module transmitting the main command to the at least one control module upon receipt of the main command, the at least one command confirmation module generating the safety command after a delay starting when the at least one command confirmation module receives the main command.

19. The control method according to claim 17, wherein upon receipt of the main command, the at least one command confirmation module generates a confirmation request for confirming the main command, the display management unit displaying the confirmation request on the display to the operator.

20. The control method according to claim 19, wherein the operator actuates at least one confirmation device independent of the at least one human-machine interface to confirm the main command when the confirmation request corresponds to a request to confirm arranging the at least one functional element into the target configuration, the at least one command confirmation module generating the safety command when the at least one confirmation device is actuated to confirm the main command.

\* \* \* \* \*